Patented July 17, 1934

1,966,757

UNITED STATES PATENT OFFICE

1,966,757

HIGH MOLECULAR CELLULOSE ESTER

Max Hagedorn, Dessau-in-Anhalt, Germany, assignor to I. G. Farbenindustrie Aktiengesellschaft, Frankfort-on-the-Main, Germany, a corporation of Germany No Drawing. Application November 6, 1928, Serial No. 317,693. In Germany November 8, 1927

8 Claims. (Cl. 260—101)

My present invention relates to high molecular esters of cellulose and an etholidic acid.

According to J. Bougault and Leon Bourdier (see Journal of the Chemical Society, Abstracts I, Vol. 96, 1909, page 82, and Abstracts I, Vol. 98, 1910, page 297, line 7 and Adolf Grün (see Collegium No. 681, 1927, pages 8–12), the name "etholides" and the name "etholidic acid" are proposed for substances containing residues of higher hydroxy fatty acids or for the free higher fatty acids respectively, which are esterified in themselves and which, for instance, correspond to the general formula

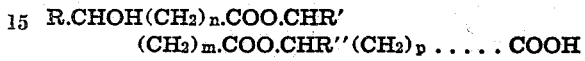

and which differ by the number of acid alcohol molecules associated in them rather than by differences in the acid alcohols themselves.

In the disclosure following hereafter and in the claims the term "etholidic acid" is intended to cover such higher hydroxy fatty acids which are esterified in themselves.

The said new esters may be prepared by causing to act upon a cellulosic compound, that is to say cellulose itself or a cellulose compound which still possesses at least one hydroxyl group capable of reacting for instance a genuine cellulose, a pre-treated cellulose, hydrocellulose, hydroxycellulose, a cellulose ester, or a cellulose ether, an agent, which comprises the chloride of an etholidic acid. Of course this esterifying agent may be composed of only one etholidic acid chloride or of several of such chlorides or of mixtures of one or several of such chlorides with one or several chlorides of higher saturated or unsaturated fatty acids or derivatives thereof, as, for instance, of their alkyl- or aryl-substitution products, the hydroxy-fatty acids or esters thereof.

In order to bind the hydrogen chloride which is evolved during the reaction, an acid binding agent may be added, as for instance a tertiary organic base, an oxide, a carbonate, or an alkali salt, or alkline earth salt of a feeble organic acid. If desired, the reaction can be carried out in an indifferent medium, for instance in a hydrocarbon, a chlorinated hydrocarbon, an ether, pyridine or the like.

Thus esters of the etholidic acids may be obtained whose content of cellulose is very small as compared with that of the hitherto known cellulose esters. Thus the known cellulose triester of ricinoleic acid $C_{60}H_{106}O_{11}$ (molecular weight=1002) of the formula

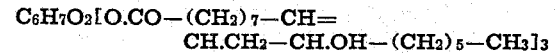

contains 16.2 per cent. of the cellulose radicle, calculated as $C_6H_{10}O_5$; on the other hand, the cellulose triester of the triricinoleic acid $C_{168}H_{298}O_{23}$ (molecular weight=2682) of the probable formula:

contains only 6 per cent. of the cellulose radicle. By the esterification with etholidic acids of a still higher molecular weight there are finally obtained esters containing 1.5—2.5 per cent. of the cellulose radicle.

The substances obtainable according to this invention are distinguished by a good stability towards acids and alkalies and show elasticity and a complete stability to water. They can be given any desired form by the application of pressure, if required, at a raised temperature. During this operation, dyestuffs, softening agents or filling materials may be added, as is usually done in the manufacture of plastic materials.

The chlorides of the etholidic acids used as esterifying agent may be made in a manner analogous to that by which chlorides of simple fatty acids are obtained.

The following example illustrates the invention:—

A mixture of 10 parts by weight of untreated cellulose, 75 parts of chlorobenzene, 35 parts of purified lauryl chloride, 10 parts of chloride of polyricinoleic acid (see, for instance, German Patents Nos. 272,337; 277,901; 333,155) and 40 parts of commercial pyridine bases is heated to 125° C. to 135° C. for 90 minutes. The product of the reaction is allowed to cool, filtered and thoroughly extracted with methanol. There are obtained 48 parts of an ester containing about 9 per cent. of cellulose, which is insoluble in the usual solvents. The compound swells slightly in glacial acetic acid, aliphatic chlorinated hydrocarbons, benzene and pyridine.

What I claim is:—

1. The process which comprises treating cellulose with polyricin-oleic acid chloride in the presence of a tertiary organic base.

2. The process which comprises treating cellulose with the chloride of polyricin-oleic acid and another higher fatty acid chloride in the presence of a tertiary organic base.

3. The process which comprises treating cellulose with the chloride of polyricin-oleic acid and another higher fatty acid chloride in the presence of pyridine.

4. The process which comprises treating cellulose with polyricinyl-oleic acid chloride and lauryl chloride in the presence of pyridine.

5. A cellulose derivative containing in its molecule the radical of polyricin-oleic acid.

6. A cellulose derivative containing in its molecule the radical of polyricin-oleic acid and the radical of another higher fatty acid.

7. A cellulose derivative containing in its molecule the radical of polyricin-oleic acid and lauric acid.

8. The cellulose triester of triricin-oleic acid.

MAX HAGEDORN.